United States Patent [19]

Labbe

[11] Patent Number: 4,474,511
[45] Date of Patent: Oct. 2, 1984

[54] CONTINUOUS TOBACCO FEED
[75] Inventor: Francis A. M. Labbe, Neuilly-sur-Seine, France
[73] Assignee: Molins Limited, London, England
[21] Appl. No.: 328,624
[22] Filed: Dec. 8, 1981
[30] Foreign Application Priority Data
Dec. 10, 1980 [GB] United Kingdom ............... 8039528
[51] Int. Cl.³ ............................................. B65G 53/58
[52] U.S. Cl. ........................................ 406/70; 406/105
[58] Field of Search .................... 406/52, 70, 93, 105, 406/168, 169, 173, 192; 131/109 B, 110

[56] References Cited
U.S. PATENT DOCUMENTS

| | | | |
|---|---|---|---|
| 3,285,670 | 11/1966 | Hubbard | 406/105 |
| 3,552,800 | 1/1971 | Truetzschler | 406/70 X |
| 3,759,580 | 9/1973 | Ott et al. | 406/105 |
| 3,797,405 | 3/1974 | Carstens et al. | 406/105 |
| 3,826,065 | 7/1974 | Labbe | 131/110 X |
| 4,219,289 | 8/1980 | Trutzschler | 406/70 |

Primary Examiner—Jeffrey V. Nase
Attorney, Agent, or Firm—Antonelli, Terry & Wands

[57] ABSTRACT

Air is conveyed pneumatically to and through a tobacco feed chute by continuously extracting air from a region in the feed chute and continuously applying air upstream of that region in the direction of movement of the tobacco. The feed chute may include a seal or valve comprising at least one roller defining a throat in the feed chute, the or each roller being rotatable such that in the throat the or each roller surface moves in the same direction as the tobacco, a plurality of vanes mounted on and displaceable radially with respect to the or each roller, a cam arrangement for controlling the radial displacement of the vanes such that they change from being extended in a region away from the throat to being fully retracted in the throat so as to draw air from downstream of the seal, between the vanes, to upstream of the seal, and a flow restricting arrangement for the or each roller for accelerating the drawn air into the throat from an upstream position.

6 Claims, 5 Drawing Figures

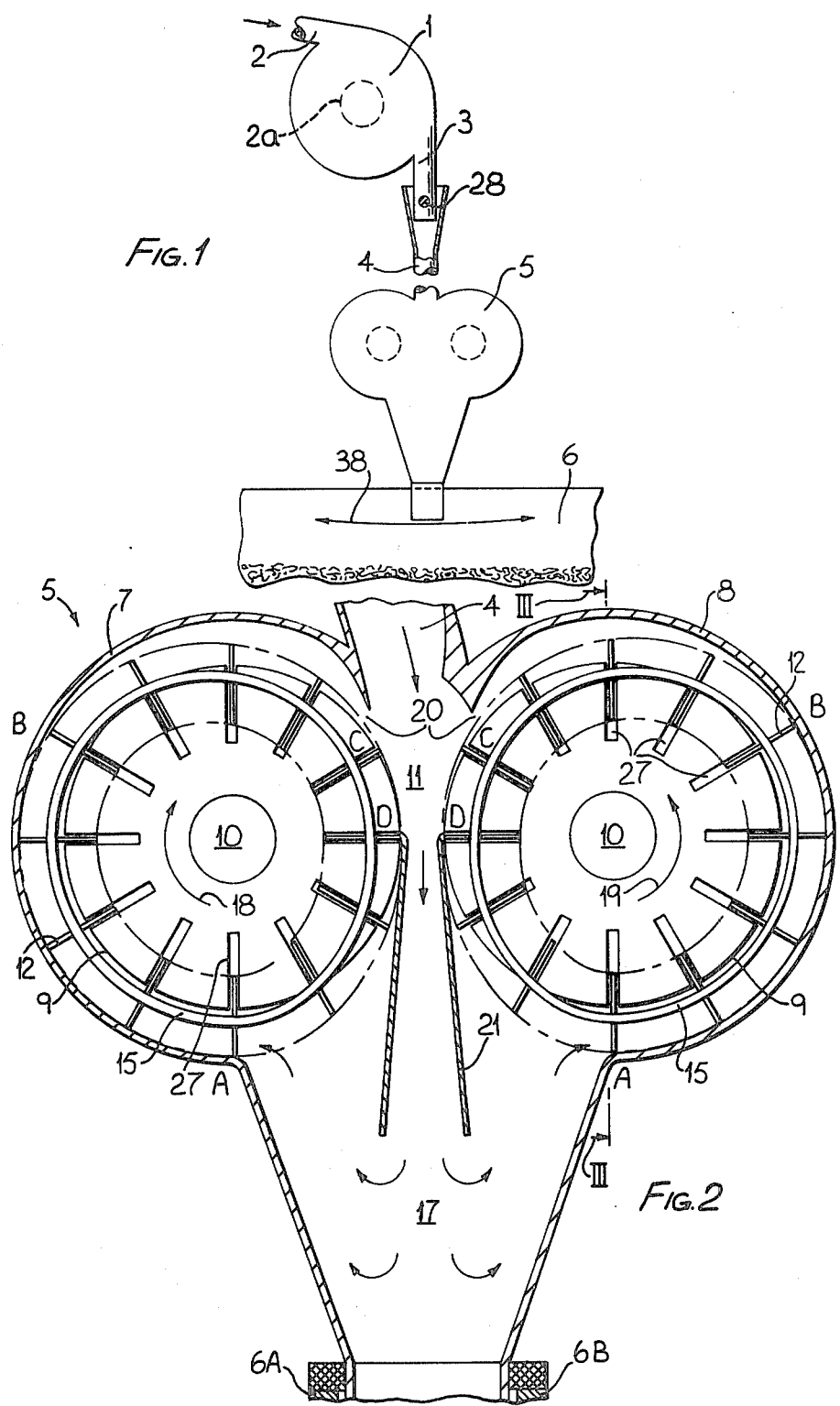

CONTINUOUS TOBACCO FEED

The present invention relates to continuous feed of particulate material and particularly to a valve system for continuous tobacco feeds.

Tobacco may be fed in a continuous stream to one or more cigarette making machines pneumatically. At each cigarette making machine the extra air used to transport the tobacco must be extracted from the tobacco stream. This may be effected using an air separator of the type described in British Pat. No. 1,397,726. However, if the tobacco is to be delivered from the separator into a space at atmospheric pressure then, because of the suction pressure existing in the separator, a valve or seal has needed to be provided to prevent air from being sucked into the separator through the tobacco outlet from the separator.

Known valves and seals for this purpose are achieved by allowing a column of tobacco to accumulate in the line from the separator output to provide an air seal between the separator and the maker, and using a rotary valve wherein tobacco is carried across the valve between vanes which prevent direct air communication between the opposite sides of the valve. The former is impractical for modern machine operating rates and pneumatic levels as the column of tobacco required to provide a effective seal would need to be up to ten feet high. The latter method can result in considerable tobacco degradation.

According to one aspect of the present invention there is provided a method of substantially ensuring unidirectional flow in a tobacco feed chute, comprising continuously extracting air from a region in the feed chute and continuously applying air upstream of said region in the direction of movement of the tobacco.

According to a preferred embodiment there is provided a method of substantially ensuring unidirectional flow in a tobacco feed chute comprising continuously extracting air from a region in the feed chute, increasing the momentum of the extracted air and then applying it upstream of said region in the direction of movement of the tobacco.

The method of the first aspect may be effected according to the second aspect of the invention, which may provide a seal for a tobacco feed chute comprising at least one roller defining a throat in the feed chute, the or each roller being rotatable such that in the throat the or each roller surface moves in the same direction as the tobacco, a plurality of vanes mounted on and displaceable radially with respect to the or each roller, means for controlling the radial displacement of the vanes such that they change from being extended in a region away from the throat to being fully retracted in the throat so as to draw air from downstream of the seal, between the vanes, to upstream of the seal, and flow restricting means for the or each roller for accelerating the drawn air into the throat from an upstream position.

Preferably two rollers are provided radially spaced one from the other defining the throat between them in the feed chute, and are counter-rotatable such that in the throat the roller surfaces move in the same direction as the tobacco.

For a better understanding of the present invention and to show how the same may be carried into effect, reference will now be made, by way of example, to the accompanying drawings, in which:

FIG. 1 shows the one position of an air "valve" according to this invention in a cigarette making system, and illustrates one method of spreading tobacco in a hopper;

FIG. 2 shows the air valve of FIG. 1 in more detail;

Figure 3:
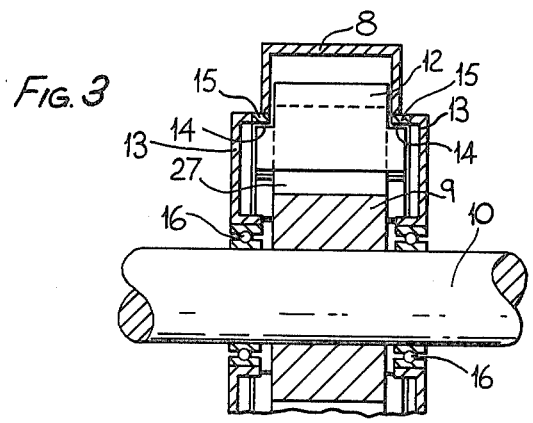
FIG. 3 is a cross-section along line III—III in FIG. 2.

FIG. 1 shows air separator 1, which may suitably be as described in British Pat. No. 1,397,726 with a tobacco and air inlet 2, a air outlet 2A connected to a suction fan (not shown) and a tobacco outlet 3 connected to feed chute 4 in which air valve 5 is positioned. Tobacco passing through air valve 5 then falls into a channel 6 forming part of the hopper of a making machine (not shown). It is spread in the channel 6 by oscillating the feed chute 4, about pivot 28, in the direction of arrow 38. A typical frequency of oscillation would be 30 cycles per minute.

The air valve 5 as shown in FIG. 2 is situated in two cylindrical casings 7 and 8 on opposed sides of feed chute 4. In each casing a roller 9 rotates on a shaft 10. The surfaces of the rollers 9 form a narrowed throat 11 between them in the feed chute 4.

A plurality of vanes 12 are mounted radially of each roller 9. The vanes may move radially of the roller and as shown in FIG. 2 are retracted into the rollers, in recesses 27, with their outer ends flush with the roller surface in the vicinity of the throat 11, yet are extended out of the roller and out of recesses 27 away from the throat. This is achieved by shoulders on the vanes (explained below with reference to FIG. 3) abutting against cam surfaces carried by annular members 13.

FIG. 3 is a cross-section along line III—III of FIG. 2 and shows the outer wall of the air valve formed by casing 8 of the feed cute 4, in which vane 12 is mounted on roller 9 which is connected to shaft 10. Shoulders 14 on the vane abut the inside surfaces of members 15 which serve as cams and limit the radial movement of the vanes 12. In FIG. 3 shoulders 14 and members 15 are shown spaced for the purpose of illustration. In practice the shoulders 14 and members 15 will be abutting owing to the centrifugal force on the vanes. The members 15 are of low-friction material such as ultrahigh molecular weight polyethelene. Shaft 10 rotates on bearings 16.

The operation of the air valve 5 will now be described with particular reference to FIG. 2.

The shafts 10 rotate in opposite directions, clockwise and counterclockwise, respectively, as illustrated by arrows 18 and 19, such that their surfaces in the region of the throat between the rollers move in the same direction as the tobacco passing through the throat, i.e. downwards. Air from the area 17 below the valve 5 is carried away in the spaces between the vanes, from the positions A to positions B, in a manner similar to a displacement pump; that is, without change of volume or pressure. At positions B the vanes begin to retract into recesses 27, but the space offered to the air is still maintained constant to prevent a pressure change. The vanes are almost fully retracted by positions C where the outer casings 7 and 8 are shaped to form with the respective rollers 9 a pair of flow restrictors in the form of nozzles 20 opening into the feed chute 4 so as to inject air into the chute in substantially downward directions with sufficient momentum to balance the suction in the throat 11. Below the throat the air expands and hence slows down as it passes between flat diverging walls 21. The walls 21 are inclined by about 10°. The process in continuous.

The centrifugal force generated in this apparatus is large: up to 700 g, so the casing should be coated with highly wear-resistant material.

As an idea of scale, the distance between walls 6A and 6B forming the channel 6 may be approximately 66 mm.

Figure 4:
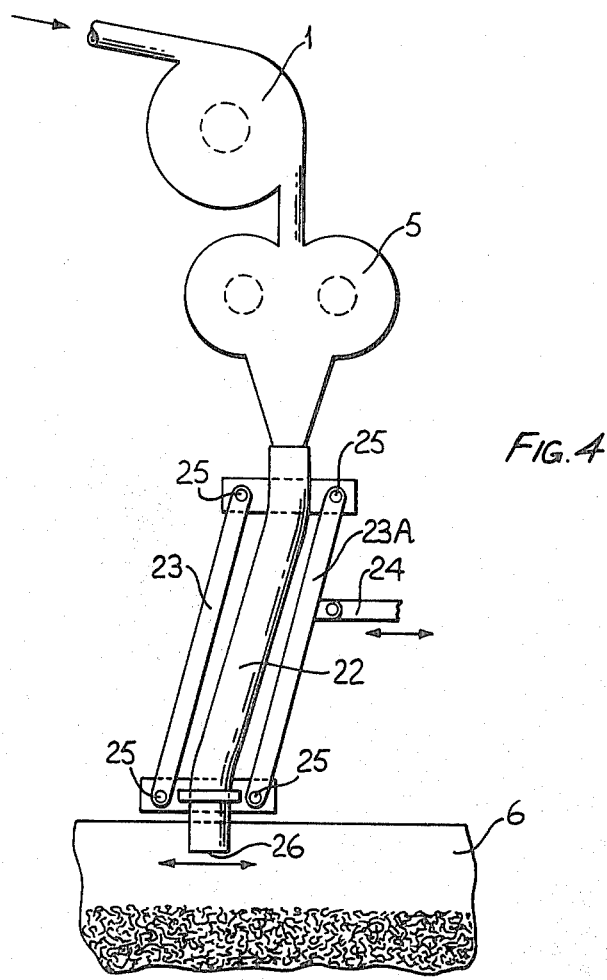
FIG. 4 illustrates another method for spreading tobacco issuing from the air valve.

FIG. 4 illustrates an air separator 1 feeding tobacco to a hopper channel 6 via an air valve 5 which is like the valve 5 in FIGS. 1 to 3 except that it is fixed in position. The outlet of the valve 5 is connected to a long flexible pipe 22 which is supported by a parallel motion device which is reciprocated by driving a lever 24 back and forth. Pivots 25 at each corner of framework 23, 23A enable the framework to constrain the pipe 22 so that the end 26 always points vertically downwards. This prevents tobacco from hitting the side walls of hopper 6 and becoming damaged.

Figure 5:
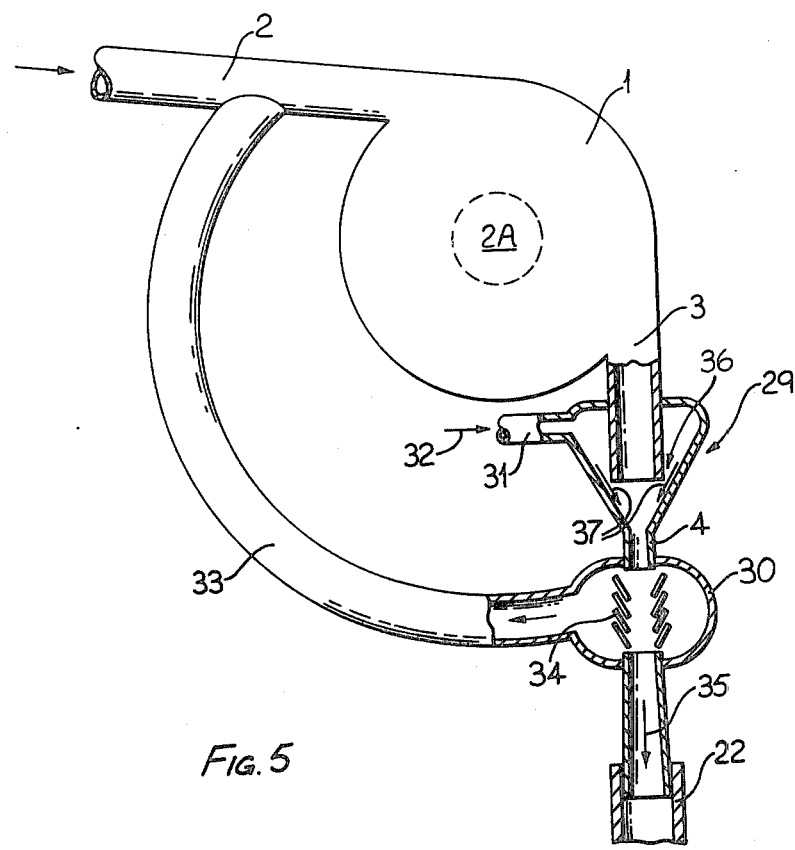
FIG. 5 illustrates an alternative form of air valve according to the invention in part cross-section.

FIG. 5 illustrates an alternative form of air valve according to the invention. It shows an air separator 1 with an air and tobacco inlet 2, a air outlet 2A, connected to a suction fan (not shown) and a tobacco outlet 3. Outlet 3 feeds tobacco down a feed chute 4 into a pipe 22 from which it falls into a making machine hopper (not shown).

In FIG. 5, a conical chute 4 is fitted with an inlet manifold 29 and an outlet manifold 30. Air is blown into inlet manifold 29 through pipe 31 in the direction of arrow 32 and is accelerated in an annular throat 36, in the region of arrows 37 to provide the momentum necessary to balance the suction from the air separator, and keep tobacco moving downwards through feed chute 4. The chute tapers by about 6°, which is a sufficient angle in this instance since the taper is three-dimensional. Air is extracted from the feed chute 4 via a manifold 30 which is connected to the inlet 2 of the air separator 1 by a pipe 33; tobacco continues to flow down the feed chute 4 in the direction of arrow 35 into pipe 22, as it is prevented from flowing into the pipe 33 by slanted vanes 34 in the manifold 30. The pipe 33 would in practice have a smaller diameter or could include a restrictor to ensure that it conducts away just sufficient air; i.e. does not induce an upward air flow from the pipe 22.

From pipe 22, the tobacco can be introduced into a cigarette making machine hopper by the system illustrated in FIG. 4.

The air valve of FIG. 5 is only suitable for relatively low suction pressures, i.e. relatively short pipes.

I claim:

1. Apparatus for pneumatically feeding tobacco, including a tobacco feed chute having sealing means for controlling the direction of air flow therethrough comprising at least one roller defining a throat in the feed chute, means for rotating the or each roller such that in the throat the or each roller surface moves in the same direction as the tobacco, a plurality of vanes mounted on and displaceable radially with respect to the or each roller, means for controlling the radial displacement of the vanes such that they change from being extended in a region away from the throat to being fully retracted in the throat so as to draw air from downstream of the sealing means, between the vanes, to upstream of the sealing means, and flow restricting means associated with the or each roller for accelerating the drawn air into the throat from an upstream position.

2. Apparatus according to claim 1 in which there are two of said rollers which are radially spaced one from the other, defining the throat between them in the feed chute, and are counter-rotatable such that in the throat the roller surfaces move in the same direction as the tobacco.

3. Apparatus according to claim 1 or claim 2 in which said sealing means includes diverging walls between which the tobacco and air pass in moving from the throat to an area from which air is drawn by the vanes.

4. Apparatus according to claim 3 in which the pressure in the said area is substantially atmospheric.

5. Apparatus according to claim 1 in which the vanes are controlled as to their radial movement by a cam surface which is arranged to engage shoulders on the vanes.

6. Apparatus according to claim 1 in which the vanes are arranged, during rotation of the roller or rollers, to conduct the air drawn thereby without significant compression until they approach the flow-restricting means.

* * * * *